May 17, 1966 L. W. SCHMIDT 3,252,023
ZERO TORQUE-PRODUCING MOTOR
Filed Jan. 12, 1961
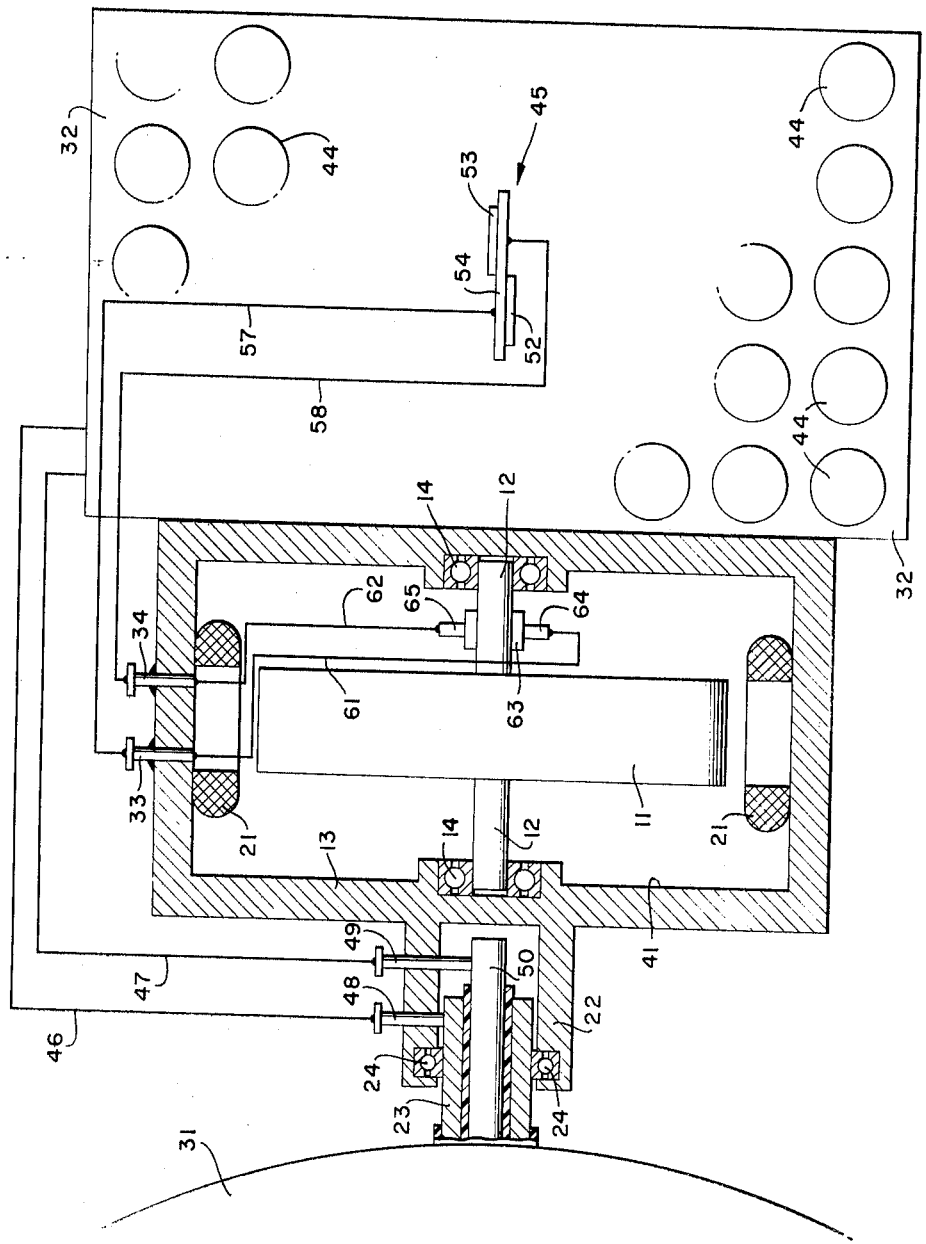
LAWRENCE W. SCHMIDT
INVENTOR.
BY *M. Jabin*
ATTORNEY

# 3,252,023
ZERO TORQUE-PRODUCING MOTOR
Lawrence W. Schmidt, Los Angeles, Calif., assignor to Hoffman Electronics Corporation, a corporation of California
Filed Jan. 12, 1961, Ser. No. 82,339
2 Claims. (Cl. 310—115)

The present invention relates to motors, and more particularly to zero torque-producing and hermetically sealed electric motors.

There is a need for a motor that can produce a torque for orienting a radiant energy seeking system while applying almost a zero torque to a space vehicle to which the motor is mechanically attached. The motor must be able to operate in the zero gravity and zero air mass regions of space. All available motors considerably torque the space vehicle as well as the servo system. In addition, all available torque-producing devices require some form of brush lubrication having a short usable life in a zero air mass environment.

It is an object of the present invention, therefore, to provide a novel almost zero torque-producing motor.

It is another object of the present invention to provide a hermetically sealed motor that can orient a radiant energy seeking system while applying almost zero torque to a space vehicle.

According to the present invention, a zero troque-producing motor comprises an armature and a field that are free to rotate with respect to each other on the action-reaction force principle of Newton's third law of motion. The rotor and field can be considered to be two rotors, one located within the other. The motor is hermetically sealed and applies almost zero torque to the satellite to which it can be connected in outer space applications. For this reason, the motor can be called a zero-torque producing motor, although, strictly speaking, it does apply a torque, however negligible, to the satellite.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

The sole figure is a sectional view of a zero torque-producing motor in accordance with the present invention.

Referring now to the drawing, the sole figure shows rotor 11 mounted on shaft 12 and coupled to rotor 13 through bearings 14, one bearing being at each end of shaft 12. Field coil 21 is mounted on the inner surface of rotor 13 between rotors 11 and 13. End 22 of rotor 13 is mounted to support shaft 23 by means of bearings 24. Support shaft 23 is connected to space vehicle or satellite 31. There is no weight problem in the support of the motor by shaft 23 since the configuration shown is designed for use in outer space. Solar cell panel 32 is mounted upon rotor 13. Terminals 33 and 34 are attached to rotor 13 for making electrical connection from an external power supply to field coil 21 and rotor 11 through rotor 13. The connection between terminals 33 and 34 the rotor 13 is hermetically sealed, so as not to break the hermetical seal of chamber 41. The operation of the device shown in the sole figure will now be described.

An electromotive force applied to terminals 33 and 34 produces an angular acceleration of rotor 11. Since rotor 13 is free to rotate about support shaft 23, the reaction produces an acceleration of rotor 13, but in the opposite direction. The motor can be considered to be an isolated system, and, hence, the resultant forces of the system are almost equal to zero. The internal forces caused by the applied electromotive force are observable as torques about the axis of rotation, and the sum of the torques is almost equal to zero with respect to any point external to the system and, in particular, with respect to satellite 31. The torque exerted by the motor system upon satellite 31 is negligible in comparison to the torque that would be exerted by a conventional motor. Thus, where T is the torque, I is the moment of inertia, $\alpha$ is the angular acceleration, and the subscripts 1, 2 and 3 refer to rotor 11, rotor 13, and satellite 31, respectively:

$$T = I_1\alpha_1 - (I_2\alpha_2 + I_3\alpha_3) = 0$$

and where $$I_3\alpha_3 \approx 0$$

then $$T = I_1\alpha_1 - I_2\alpha_2 = 0$$

and $$I_1\alpha_1 = I_2\alpha_2$$

The difference in the masses of rotors 11 and 13, and the difference in their distances from the axis of rotation, result in a difference in the angular velocities of rotors 11 and 13. This difference in angular velocity may be utilized to produce a step-up or step-down speed ratio, with respect to a fixed point in space, by control of the masses and radii.

Since the system may be completely enclosed and sealed, with rotor 11 being suspended within chamber 41, which is an enclosure formed by rotor 13, the seal can be of a hermetic type. Chamber 41 may contain and retain any fluid, gas, or liquid that would enhance the operation of the system. A hermetic seal prevents evaporation and loss of lubricants, aids viscous damping, and results in prolonged life in a controlled atmosphere.

The load, which in the sole figure is solar panel 32, is attached externally to chamber 41 and is connected to rotor 13 as an integral part thereof. The attachment of solar panel 32 increases the mass of rotor 13, resulting in a reduction of speed thereof. This reduction of speed may be counteracted by increasing the mass of rotor 11.

Solar cell panel 32, which contains solar cells 44, can be caused to track the sun, or other source of radiant energy by means of the rotation of rotor 13. Rotor 11 can be caused to rotate by an electromotive force supplied by means of switch 45, which is sensitive to relative motion of the sun. Solar cells 44 supply electric power to satellite 31 by means of wires 46 and 47, brushes 48 and 49, and shafts 23 and 50, respectively. Shafts 23 and 50 are electrically insulated from each other and from the frame of satellite 31.

Switch 45 contains solar cells 52 and 53 mounted upon shield 54 so that solar cells 52 and 53 face in opposite directions and lie in a plane perpendicular to the plane of panel 32. Solar cells 52 and 53 are electrically connected through wires 57 and 58 to terminals 33 and 34, respectively, and to solar cells 44. Terminals 33 and 34 are connected by means of wires 61 and 62 to commutator 63 through brushes 64 and 65, respectively. When the sun's rays are not perpendicular to panel 32, either solar cell 52 or solar cell 53 will receive more isolation, and a potential difference will be applied across terminals 33 and 34, thereby energizing rotor 11.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. A motor adapted to exert a minimum torque on a space vehicle on which it is mounted comprising: a first shaft fixedly mounted on said space vehicle; a first hollow cylindrical rotor having an hermetically-sealed chamber therein; bearing means for rotatably mounting said first rotor on said first shaft; a second shaft completely positioned within said chamber; a second rotor fixedly mounted on said second shaft; bearing means for rotatably mounting said second shaft on said first rotor whereby said first and second rotors have the same axis of rotation; an annular field coil positioned within said chamber and fixedly mounted on said first rotor adjacent said second rotor; first and second electrical terminals extending through said first rotor into said chamber; means for electrically coupling said terminals with said field coil and with said second rotor; and means for coupling said terminals with an external source of potential for energizing said field coil and said second rotor; such energization causing said second rotor to rotate in a first direction relative to said space vehicle, rotation of said second rotor causing said first rotor to rotate in the opposite direction relative to said space vehicle whereby a substantially zero torque is exerted on said space vehicle.

2. The apparatus of claim 1 wherein a solar panel is fixedly mounted on said first rotor for supplying electrical energy to said space vehicle, and said external source produces a potential the magnitude of which depends on the relative position of the sun with respect to said solar cell panel.

References Cited by the Examiner

UNITED STATES PATENTS

| | | | |
|---|---|---|---|
| 1,461,852 | 7/1923 | Kasley | 310—115 |
| 2,039,701 | 5/1936 | Bush | 310—115 X |
| 2,121,073 | 6/1938 | Bothezat | 310—115 X |
| 2,191,872 | 2/1940 | Upton | 310—115 |
| 2,462,182 | 2/1949 | Guerdan et al. | 310—115 |
| 3,079,518 | 2/1963 | Moore | 310—115 |

FOREIGN PATENTS 930,243 6/1955 Germany.

ORIS L. RADER, *Primary Examiner.*

MILTON O. HIRSHFIELD, *Examiner.*

J. A. HINKLE, J. W. GIBBS, *Assistant Examiners.*